May 9, 1950      M. PAUL      2,506,970
NUTCRACKER ATTACHMENT FOR ORANGE
SQUEEZERS OR THE LIKE
Filed Dec. 22, 1947
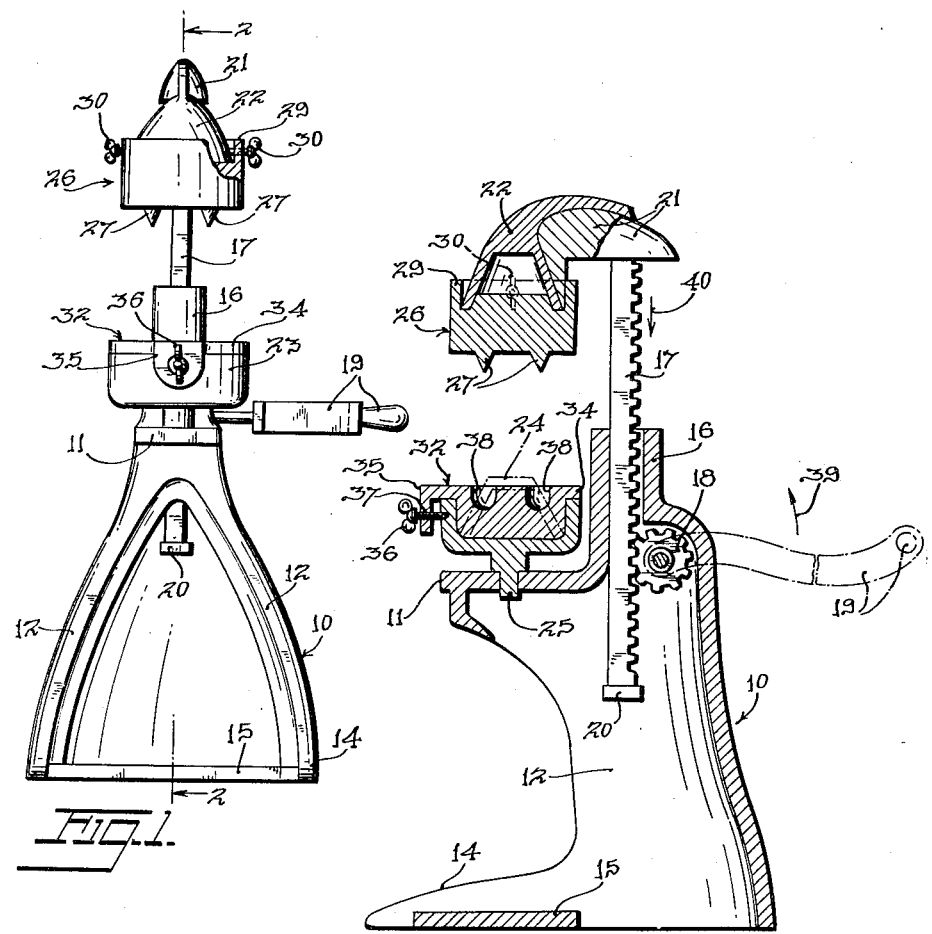
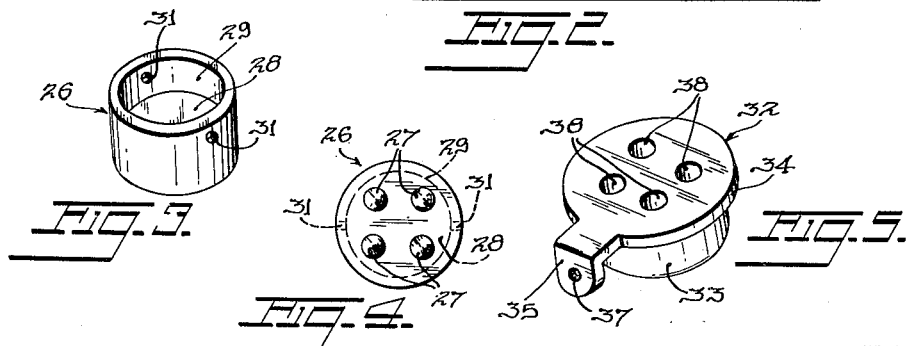
INVENTOR.
MILTON PAUL
BY
*ATTORNEY*

Patented May 9, 1950

2,506,970

UNITED STATES PATENT OFFICE 2,506,970

NUTCRACKER ATTACHMENT FOR ORANGE SQUEEZERS OR THE LIKE

Milton Paul, Great Neck, N. Y.

Application December 22, 1947, Serial No. 793,100

5 Claims. (Cl. 146—16)

1

This invention relates to new and useful improvements in kitchen and similar appliances, and, more particularly, aims to provide a novel and valuable such appliance in the form of a multiple nut cracker.

An object is to provide, in one aspect of the invention, a combination of parts for ready attachment to and detachment from a familiar type of orange squeezer, to transform the latter when desired into a nut cracker, and, in another aspect of the invention, to provide a combination appliance which may be used for either orange squeezing or nut cracking.

The type of orange squeezer to which the first mentioned combination of parts is applicable, and which is included in the second mentioned combination appliance, is preferably an orange or lemon squeezer of the kind including a suitable framework carrying a vertically reciprocable ram operated by a rack moved by turning a crankhandle, with such ram adapted to coact with what may be called an anvil at a fixed point below the ram; and consequently the invention is illustrated by way of a now favored embodiment thereof associated with an orange squeezer having the elements just mentioned included therein. As is well known, said ram is shaped to incorporate an inverted cup-shaped member, and said anvil is shaped to incorporate an upwardly extending projection shaped to some extent in agreement with the shape of said cup.

A feature of the invention is the provision of an auxiliary and attachable or substitutable anvil having a plurality of recesses in each of which may be set a nut to be cracked, in combination with an attachable or substitutable ram having projections equal in number to said recesses, whereby with the appliance to function as a nut cracker, it is operated in the same way as when set up to function as an orange squeezer, and whereby, further, on each operation of the device as a nut cracker a plurality of nuts are simultaneously cracked.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a view showing in front elevation an orange squeezer of the kind above referred to, with an auxiliary ram, this shown as partially broken away, secured to the orange squeezer ram,

2 and with an auxiliary anvil secured to the usual hollow carrier for the orange squeezer anvil.

Fig. 2 is a vertical sectional view, taken on the line 2—2 of Fig. 1.

Fig. 3 shows the auxiliary ram in perspective, looking down on the same.

Fig. 4 is a bottom plan view thereof.

Fig. 5 shows the auxiliary anvil in perspective, looking down on the same.

The nut cracker attachment, according to the present invention, is shown applied to an orange squeezer having a casting 10 including a shelf 11, and a supporting structure therebelow having a wall portion shaped to extend around the back and sides of said supporting structure, with such sides having forwardly extended feet 14 joined by a bottom wall 15.

Alongside the rear end of the shelf 11, the casting 10 is extended upwardly to provide a tubular guideway 16 for a rack 17. Said rack meshes with a spur gear or pinion 18 suitably journalled in the casting 10 and having a fixed connection with a crank-handle 19 swingable about the axis of said gear. To prevent accidental raising of the bottom of the rack beyond the gear 18, the rack at its lower end carries an enlargement 20. The top of the rack rigidly carries a block 21, to which is suitably fixed the ram 22 of the orange squeezer.

The shelf 11 supports a cup-shaped carrier 23 for the anvil of the orange squeezer, the latter being indicated at 24 in dot and dash lines. Said anvil ordinarily fits in the hollow interior of the carrier 23 so as to be centered therein, and the anvil is there held in place merely by its own weight, to permit easy removal and washing of the anvil. The carrier 23 is also usually held in place merely by gravity, so as also to be easily removable for washing. In the orange squeezer herein illustrated, the carrier has a depending stem 25 of square or some other polygonal cross section, insertable downward into an opening of like cross section through the shelf 11.

Referring now to the auxiliary ram, this is shown as a cylindrical member, marked as a whole 26, of metal or some other similarly rugged material, and carrying at its under side a plurality of ram elements for nut cracking use, these in the present case being shown as downwardly directed spikes 27. Four of such spikes are shown, but, as will be understood, any plurality thereof other than four, more or less, may be provided. As will also be understood, these ram elements may be otherwise formed than as pointed spikes; for instance, as downward projections having cup-like depressions at their bottoms, or as such projections each terminating in one or more blade like or otherwise shaped shell splitting elements.

The upper portion of the auxiliary ram 26 is of tubular form, providing a chamber 28 surrounded by an upstanding circular wall 29, said chamber having a diameter matching the maximum bottom diameter of the orange squeezer ram 22, so that the ram 26 may be relatively mounted on the ram 22 as illustrated. For securing the ram 26 in a selected angular adjustment on the ram 22, a means is shown including a pair of thumb-screws 30 threadedly engaging tapped holes 31 through the wall 29 at points thereon one of which is diametrically opposite the other.

The auxiliary anvil, marked as a whole 32, and also made of metal or a similarly rugged material, is shown as having a main lower portion 33 shaped to fit within the hollow interior of the carrier 23, and an upper rim portion 34 for resting on the upper rim portion of the carrier. For securing the anvil 32 in a desired rotative position relative to said carrier, a means is shown including an L-shaped extension 35 from said rim portion 34, and a thumb-screw 36 threadedly engaging a tapped hole 37 through the outer depending portion of the extension 35.

On the top of the auxiliary anvil 32, in locations vertically alignable with the spikes 27 or equivalents, are nut receiving recesses 38, each for receiving a nut. By aid of the means incorporating the screws 30 and 36 such alignment can be made and secured against subsequent casual or accidental disturbance.

As by now will be clear, once the parts have been set up as just described, a plurality of nuts, one resting in each of the recesses 38, may be simultaneously cracked, merely by rotating the crank-handle in the direction of the arrow 39, thereby to move the rack 17 in the direction of the arrow 40 and so advance the ram 26 into nut cracking coaction with the anvil 32, in exactly the same way the appliance would be operated for orange squeezing were the parts 26 and 32 removed and the orange squeezer ram 24 placed in the carrier 23.

As will be understood, the auxiliary anvil 32 could be given a concave shape at its bottom adapted to surround the anvil 24, with then the anvil 32 directly supported on the anvil 24. In that case, of course, the anvil 32 would be suitably increased in height to locate the bottoms of its nut receiving recesses above the top of the anvil 24, and the outer depending portion of the extension 35 would be increased sufficiently in length to allow the screw 36 to be clampingly applied to the carrier 23. However, such arrangement is not recommended, as often for sanitary reasons the orange squeezer anvil 24 is made of glass and so of comparatively small structural strength.

It is to be understood that if desired, the device may also be used as an ice crusher.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A nut cracking appliance comprising an auxiliary ram having nut cracking means and for securement to the ram of an orange squeezer wherein said ram is mounted for movement toward and away from the anvil of said squeezer and hence toward and away from a supporting means for said anvil, means for detachably securing said auxiliary ram to the squeezer ram, an auxiliary anvil having nut cracking means for coaction with the first named nut cracking means, and means for securing said auxiliary anvil to said supporting means, said securing means being adjustable to align the first named nut cracking means with the second named nut cracking means, one of said nut cracking means comprising a plurality of spaced projections and the other of said nut cracking means comprising a plurality of similarly spaced recesses each for receiving a nut, whereby the squeezer may be operated to crack a plurality of nuts simultaneously, said auxiliary ram having said projections at its bottom and carrying at its upper portion a cylindrical wall surrounding a recess for receiving the bottom portion of the squeezer ram, and the first named securing means including a screw threadedly engaging a tapped hole through said wall, said auxiliary anvil having said recesses in its top and being shaped to include a bottom portion for downwardly projecting into said carrier and also to include a rim portion to rest on the top of said carrier, there being a downward extension from said rim portion, and the second named securing means including a screw threadedly engaging a tapped hole through said extension.

2. A nut cracker attachment for use on an orange squeezer having a fixedly mounted cup-shaped carrier and a ram movable toward and away from the carrier, comprising an auxiliary anvil positioned in the carrier and having its top face formed with a plurality of recesses into which nuts to be cracked are placed, means securing said anvil in a fixed position on the carrier, an auxiliary ram rotatively mounted on the ram of the orange squeezer to move toward and away from said auxiliary anvil when the ram of the orange squeezer is moved relative to the carrier, a plurality of ram elements formed on the bottom face of said auxiliary ram one for each of the recesses of said anvil, and means for securing said auxiliary ram in a desired rotative position on the ram of the orange squeezer in which said ram elements will be aligned with their respective recesses to enter said recesses and crack the nuts positioned therein when said auxiliary ram moves toward said auxiliary anvil.

3. A nut cracker attachment for use on an orange squeezer having a fixedly mounted cup-shaped carrier and a ram movable toward and away from the carrier, comprising an auxiliary anvil positioned in the carrier and having its top face formed with a plurality of recesses into which nuts to be cracked are placed, means securing said anvil in a fixed position on the carrier, an auxiliary ram rotatively mounted on the ram of the orange squeezer to move toward and away from said auxiliary anvil when the ram of the orange squeezer is moved relative to the carrier, a plurality of ram elements formed on the bottom face of said auxiliary ram one for each of the recesses of said anvil, and means for securing said auxiliary ram in a desired rotative position on the ram of the orange squeezer in which said ram elements will be aligned with their respective recesses to enter said recesses and crack the nuts positioned therein when said auxiliary ram moves toward said auxiliary anvil, said anvil securing means comprising a rim portion formed on said anvil and resting on the top of the carrier, an L-shaped extension integrally formed with said rim portion and having a part depending along the outer periphery of the carrier, and a thumbscrew threaded through said depending part and tightened against the outer periphery of the carrier.

4. A nut cracker attachment for use on an orange squeezer having a fixedly mounted cup-shaped carrier and a ram movable toward and away from the carrier, comprising an auxiliary anvil positioned in the carrier and having its top face formed with a plurality of recesses into which nuts to be cracked are placed, means securing said anvil in a fixed position on the carrier, an auxiliary ram rotatively mounted on the ram of the orange squeezer to move toward and away from said auxiliary anvil when the ram of the orange squeezer is moved relative to the carrier, a plurality of ram elements formed on the bottom face of said auxiliary ram one for each of the recesses of said anvil, and means for securing said auxiliary ram in a desired rotative position on the ram of the orange squeezer in which said ram elements will be aligned with their respective recesses to enter said recesses and crack the nuts positioned therein when said auxiliary ram moves toward said auxiliary anvil, said ram elements being in the form of downwardly directed spikes.

5. A nut cracker attachment for use on an orange squeezer having a fixedly mounted cup-shaped carrier and a ram movable toward and away from the carrier, comprising an auxiliary anvil positioned in the carrier and having its top face formed with a plurality of recesses into which nuts to be cracked are placed, means securing said anvil in a fixed position on the carrier, an auxiliary ram rotatively mounted on the ram of the orange squeezer to move toward and away from said auxiliary anvil when the ram of the orange squeezer is moved relative to the carrier, a plurality of ram elements formed on the bottom face of said auxiliary ram one for each of the recesses of said anvil, and means for securing said auxiliary ram in a desired rotative position on the ram of the orange squeezer in which said ram elements will be aligned with their respective recesses to enter said recesses and crack the nuts positioned therein when said auxiliary ram moves toward said auxiliary anvil, said auxiliary ram securing means comprising an upstanding circular wall formed on the top of said auxiliary ram and engaged about the bottom of the ram of the orange squeezer, and thumbscrews threaded through said circular wall and tightened against the bottom of the ram of the orange squeezer.

MILTON PAUL.

REFERENCES CITED

The following references are of record in the file of this patent:

UNITED STATES PATENTS

| Number | Name | Date |
|---|---|---|
| 718,977 | Budesheim | Jan. 27, 1903 |
| 1,263,151 | Topalian | Apr. 16, 1918 |
| 1,427,898 | Himelfarb | Sept. 5, 1922 |
| 1,556,424 | Cook | Oct. 6, 1925 |
| 1,710,629 | Lindsey | Apr. 23, 1929 |
| 2,003,299 | Marlowe | June 4, 1935 |
| 2,200,032 | Lovelace | May 7, 1940 |
| 2,373,781 | Richardson | Apr. 17, 1945 |
| 2,374,851 | Curtice | May 1, 1945 |

FOREIGN PATENTS

| Number | Country | Date |
|---|---|---|
| 610,719 | France | June 14, 1926 |
| 122,954 | Switzerland | Mar. 1, 1928 |